United States Patent
Asahara

(10) Patent No.: US 8,379,239 B2
(45) Date of Patent: Feb. 19, 2013

(54) INFORMATION PROCESSING APPARATUS AND INFORMATION PROCESSING METHOD FOR EXECUTING PROCESS REQUESTED BY AN EXTERNAL DEVICE

(75) Inventor: Hideo Asahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1365 days.

(21) Appl. No.: 11/936,072

(22) Filed: Nov. 6, 2007

(65) Prior Publication Data

US 2008/0130041 A1   Jun. 5, 2008

(30) Foreign Application Priority Data

Dec. 4, 2006   (JP) .................................. 2006-327636

(51) Int. Cl.
  *G06K 15/00*   (2006.01)
(52) U.S. Cl. ...................... 358/1.14; 358/1.13; 358/1.15; 709/227; 399/80; 399/81; 399/87; 715/733; 715/740; 715/741
(58) Field of Classification Search .................. 358/1.14, 358/1.15, 1.1, 19; 709/227–229; 399/80, 399/81, 87; 715/733, 740, 741, 743, 744, 715/745, 750
See application file for complete search history.

(56) References Cited

U.S. PATENT DOCUMENTS

| | | | | |
|---|---|---|---|---|
| 5,991,516 | A * | 11/1999 | Desmond et al. | 358/1.17 |
| 6,476,927 | B1 * | 11/2002 | Schwarz, Jr. | 358/1.15 |
| 7,382,487 | B2 * | 6/2008 | Ikegami | 358/1.6 |
| 7,636,795 | B2 * | 12/2009 | Hess et al. | 710/8 |
| 7,686,525 | B2 * | 3/2010 | Uchida | 400/76 |
| 7,925,767 | B2 * | 4/2011 | Iwamoto et al. | 709/229 |
| 7,978,354 | B2 * | 7/2011 | Uchikawa | 358/1.14 |
| 8,059,303 | B2 * | 11/2011 | Shaw | 358/1.18 |
| 8,176,075 | B2 * | 5/2012 | Kuroyanagi | 707/781 |
| 2002/0073003 | A1 * | 6/2002 | Levine | 705/30 |
| 2003/0081242 | A1 * | 5/2003 | Simpson et al. | 358/1.15 |
| 2003/0105849 | A1 * | 6/2003 | Iwamoto et al. | 709/223 |
| 2003/0160992 | A1 * | 8/2003 | Weaver | 358/1.14 |
| 2003/0167336 | A1 * | 9/2003 | Iwamoto et al. | 709/229 |

(Continued)

FOREIGN PATENT DOCUMENTS

| | | |
|---|---|---|
| JP | 2002-077488 | 3/2002 |
| JP | 2003-182190 | 7/2003 |

(Continued)

OTHER PUBLICATIONS

Chinese Office Action dated Jul. 3, 2009 in corresponding Chinese Application No. 200710162098.0.

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

It is set for one or more processes executable by a multi-function peripheral apparatus (101) whether or not permitting the multi-function peripheral apparatus (101) to perform, of the processes, a process, execution of which is requested by a multi-function peripheral apparatus (102) or client PC (103). Information about a process set to be permitted is transmitted to the multi-function peripheral apparatus (102) or client PC (103).

10 Claims, 8 Drawing Sheets

U.S. PATENT DOCUMENTS

| | | | |
|---|---|---|---|
| 2004/0062562 A1* | 4/2004 | Nakatani et al. | 399/82 |
| 2005/0172151 A1* | 8/2005 | Kodimer et al. | 713/201 |
| 2006/0187486 A1* | 8/2006 | Tsuchitoi | 358/1.15 |
| 2006/0256372 A1* | 11/2006 | Suzuki | 358/1.15 |
| 2007/0157109 A1* | 7/2007 | Kim et al. | 715/773 |
| 2008/0192286 A1* | 8/2008 | Shaw | 358/1.15 |
| 2009/0091791 A1* | 4/2009 | Ferlitsch | 358/1.15 |
| 2009/0133104 A1* | 5/2009 | Iwamoto et al. | 726/4 |

FOREIGN PATENT DOCUMENTS

| | | |
|---|---|---|
| JP | 2003256180 A | 9/2003 |
| JP | 2004-198889 | 7/2004 |
| JP | 2004345200 A | 12/2004 |
| JP | 2005044079 A | 2/2005 |
| JP | 2006318098 A | 11/2006 |

* cited by examiner

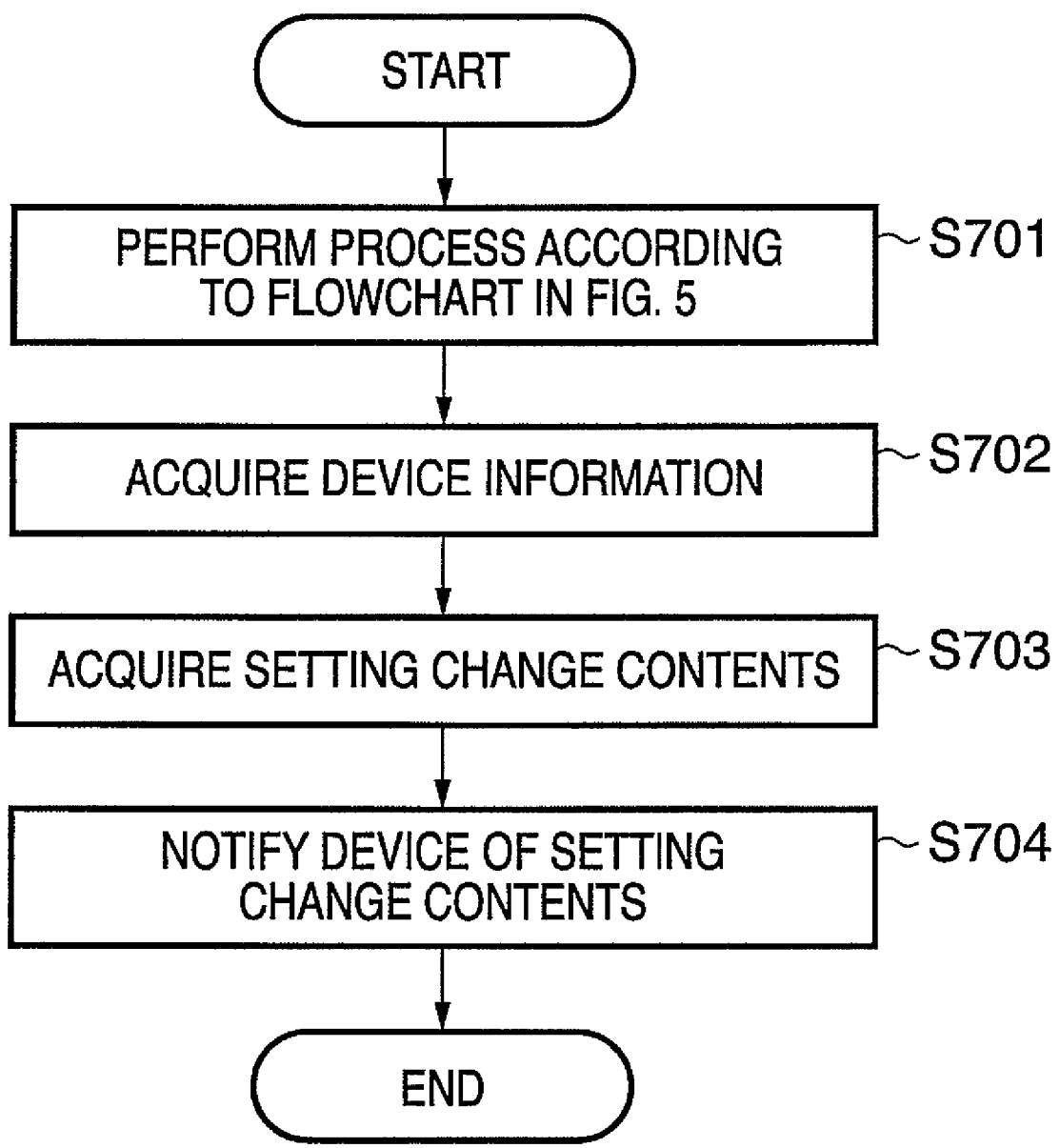

INFORMATION PROCESSING APPARATUS AND INFORMATION PROCESSING METHOD FOR EXECUTING PROCESS REQUESTED BY AN EXTERNAL DEVICE

BACKGROUND OF THE INVENTION

1. Field of the Invention

The present invention relates to a technique of controlling execution of a process requested by an external device.

2. Description of the Related Art

There has been provided a technique which allows a client device to use, via a network, services such as Web services provided by a device different from the client device. Services for use are sometimes automatically selected. In general, however, a system searches for services available to achieve a purpose, and a user selects a service he or she wants to use from a list of detected services. The user can thus freely utilize the functions of another device.

This mechanism also enables the use of functions provided by a multi-function peripheral apparatus from a network. Examples of the provided functions are a print job by copy, a send job by e-mail or the like, and an image process such as character recognition.

When an environment where a given device can use the functions of another device is set, a device having minimum functions selected in accordance with an application purpose can be installed at a place as close as possible to a user. This use form cuts the cost of using the functions of a multi-function peripheral apparatus by a user while covering the installation cost of necessary hardware by minimizing the functions of the multi-function peripheral apparatus.

In this use form, for example, a multi-function peripheral apparatus may be installed beside a user's desk or in a meeting room. In this case, noise of the multi-function peripheral apparatus, which is a conventional problem, becomes a more serious issue when, for example, the nearby multi-function peripheral apparatus starts printing or performs FAX transmission during a meeting or phone conversation.

To solve this problem, the multi-function peripheral apparatus can also be simply turned off so as not to generate any operation sound. However, when a user near the multi-function peripheral apparatus wants to use it, the user must turn it on and wait until the multi-function peripheral apparatus starts up. This impairs user friendliness.

Japanese Patent Laid-Open No. 2003-182190 describes a solution to device noise. This reference discloses a technique of shifting depending on the time period to a mode in which no large noise is generated. However, only setting the time period may not satisfy user's purposes.

Japanese Patent Laid-Open Nos. 2002-077488 and 2004-198889 disclose techniques of setting a quiet mode in which the total noise of a reader and printer does not exceed a predetermined level, or setting a low-noise operation mode in which noise is suppressed by decreasing the print speed, and providing a mode switching means.

However, these prior arts do not consider the use of services from a remote place, and are not effective for the above-mentioned use form in which the use of services is limited.

If the use of services is simply limited against the above-described problem, the use of services which do not generate noise is also limited, impairing user friendliness.

In the use form in which a multi-function peripheral apparatus is installed beside a desk or in a meeting room, a demand arises for limiting an operation from a remote place while permitting the use of a function based on an operation to the multi-function peripheral apparatus because the user does not mind operation sound. However, the above-mentioned prior arts do not meet even this demand.

SUMMARY OF THE INVENTION

The present invention has been made to overcome the conventional drawbacks, and has as its object to provide a technique of improving user friendliness of an apparatus which performs various processes including a process requested by a device at a remote place.

To solve the above-described problems and achieve the object, according to the first aspect of the present invention, an information processing apparatus which executes a process requested by an external device, comprises:

a setting unit configured to set, for at least one process executable by the information processing apparatus, whether or not permitting an execution for the at least one process requested from the external device; and a transmission unit configured to transmit, to the external device, information about a process set by said setting unit to be permitted.

To solve the above-described problems and achieve the object, according to the second aspect of the present invention, an information processing method by an information processing apparatus which executes a process requested by an external device, comprises:

causing a setting unit to set, for at least one process executable by the information processing apparatus, whether or not permitting the information processing apparatus to perform a process, execution of which is requested by the external device, of the at least one process; and causing a transmission unit to transmit, to the external device, information about a process set in the setting step to be permitted.

Further features of the present invention will become apparent from the following description of exemplary embodiments with reference to the attached drawings.

BRIEF DESCRIPTION OF THE DRAWINGS

FIG. 7 is a flowchart showing a process executed by the control device 210 to announce change of settings when detailed settings of the limitation mode have changed in the multi-function peripheral apparatus 101.

DESCRIPTION OF THE EMBODIMENTS

Preferred embodiments of the present invention will be described in detail below with reference to the accompanying drawings.

[First Embodiment]

Figure 1:
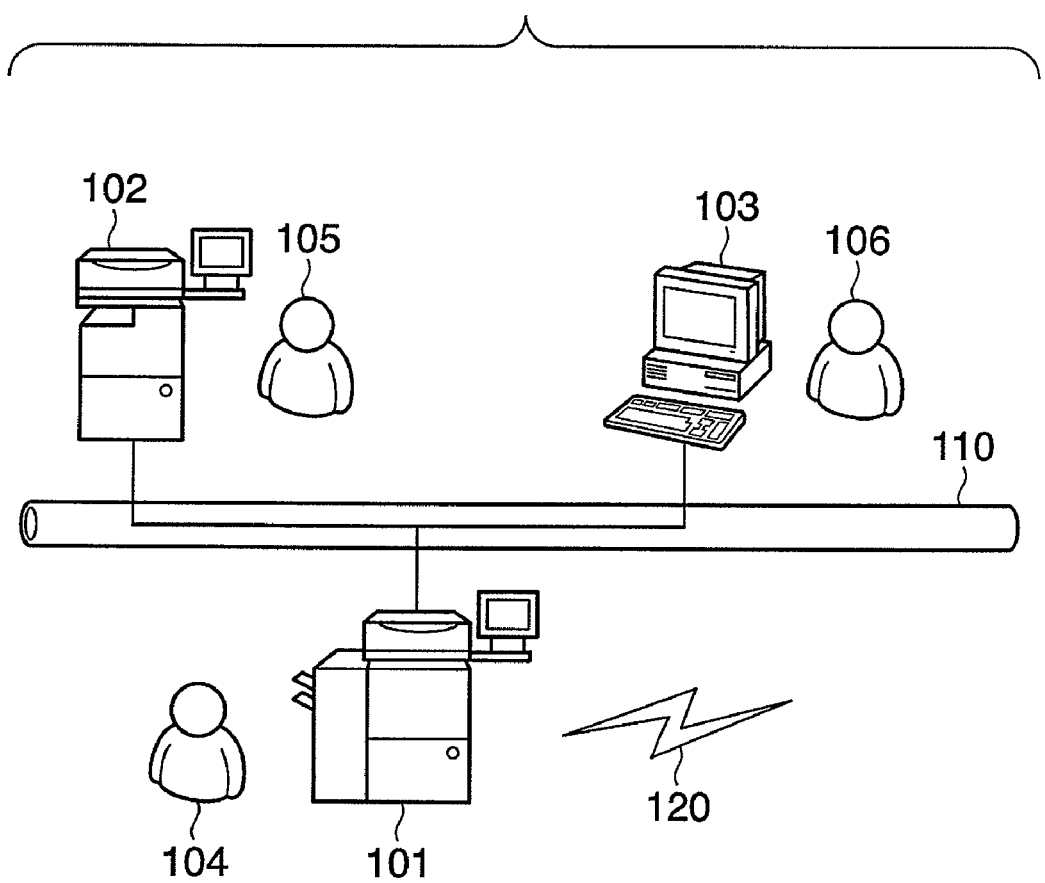
FIG. 1 is a view showing a configuration example of a system according to the first embodiment of the present invention.

FIG. 1 is a view showing a configuration example of a system according to the first embodiment. As shown in FIG. 1, the system according to the first embodiment comprises multi-function peripheral apparatuses 101 and 102 and a client PC 103 which are connected to a LAN 110. These devices can communicate data with each other via the LAN 110.

The multi-function peripheral apparatus 101 will be explained first. The multi-function peripheral apparatus 101 executes processes requested by the multi-function peripheral apparatus 102 and client PC 103. The multi-function peripheral apparatus 101 is also connected to a telephone line 120, and can perform FAX transmission/reception via the telephone line 120.

Next, the multi-function peripheral apparatus 102 will be explained. The multi-function peripheral apparatus 102 can cause the multi-function peripheral apparatus 101 to execute a desired process by sending an inquiry and requesting for executing the desired process to the multi-function peripheral apparatus 101. This also applies to the client PC 103.

The multi-function peripheral apparatuses 101 and 102 and the client PC 103 are operated by users 104, 105, and 106, respectively.

In FIG. 1, the LAN 110 is used as an example of a network. However, another type of network is also available including a large-scale WAN typified by WWW, and a network peer-to-peer-connected by an Ethernet® cable.

Figure 2:
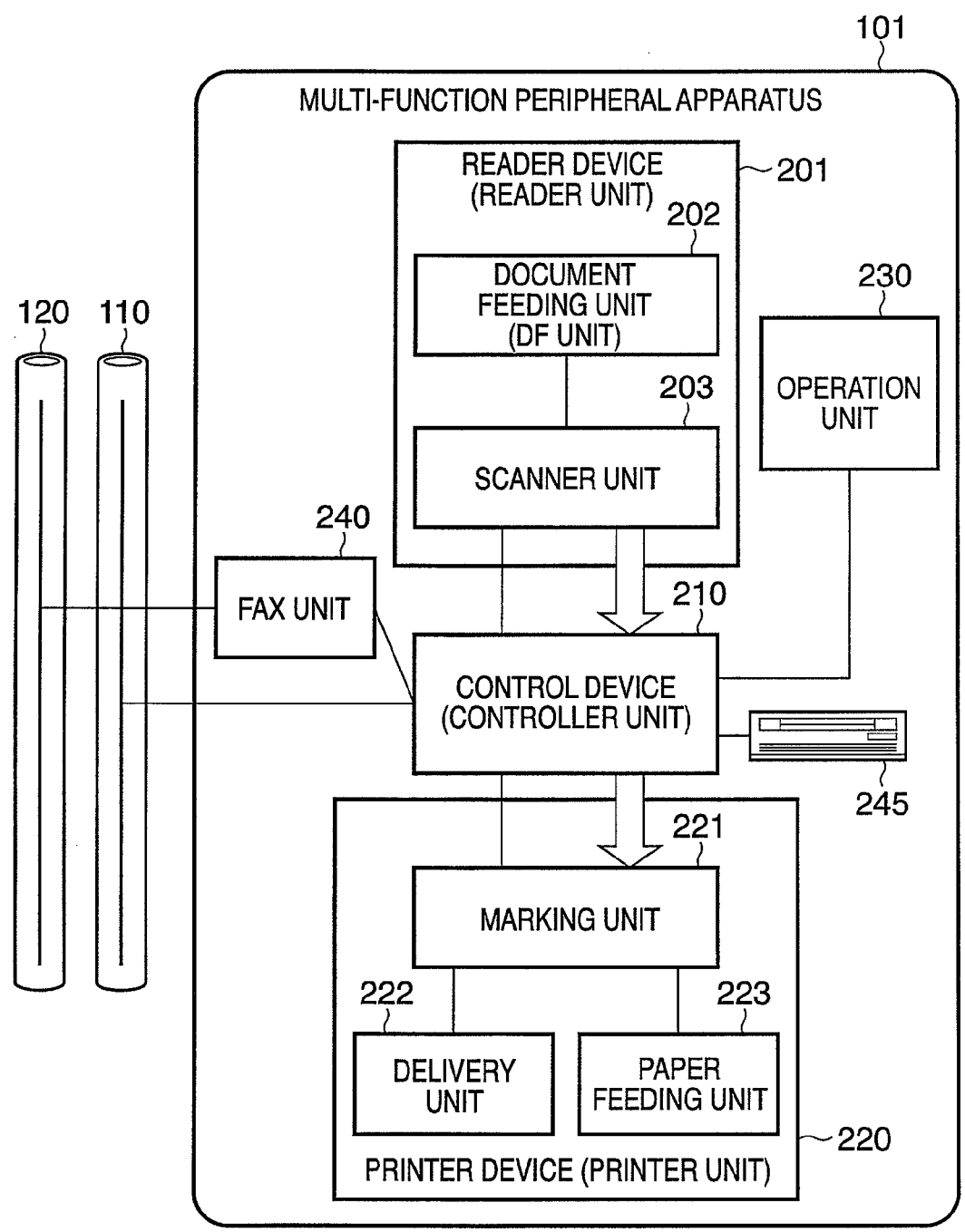
FIG. 2 is a block diagram showing the hardware configuration of a multi-function peripheral apparatus 101.

FIG. 2 is a block diagram showing the hardware configuration of the multi-function peripheral apparatus 101. As shown in FIG. 2, the multi-function peripheral apparatus 101 comprises a FAX unit 240, reader device (reader unit) 201, control device (controller unit) 210, operation unit 230, HDD (Hard Disk Drive) 245, and printer device (printer unit) 220.

As shown in FIG. 2, the reader device 201 comprises a document feeding unit 202 and scanner unit 203. The document feeding unit 202 conveys a document sheet. The scanner unit 203 optically reads information printed on the document sheet, and outputs the read result as an image. The arrangement of the reader device 201 is not limited to this. The reader device 201 may not comprise the document feeding unit 202 (in this case, the operator sets a document on the platen glass and designates reading, and the sensor reads the document).

As shown in FIG. 2, the printer device 220 comprises a marking unit 221, delivery unit 222, and paper feeding unit 223. The paper feeding unit 223 has a plurality of print sheet cassettes. Print sheets are supplied one by one from one designated print sheet cassette to the marking unit 221.

The marking unit 221 transfers and fixes image data received from the control device 210 onto a print sheet supplied from the paper feeding unit 223, and then supplies the print sheet to the delivery unit 222. The delivery unit 222 sorts and staples the received print sheets, and outputs them outside the apparatus.

The control device 210 controls the operations of the units shown in FIG. 2 by executing processes using programs and data stored in the internal memory of the control device 210.

For example, the control device 210 controls the reader device 201 to make the reader device 201 to read information printed on a document as an image, and transfer the read image data to the printer device 220. Then, the control device 210 controls the printer device 220 to make the printer device 220 to print the image data on a print sheet. By performing a series of the control operations, the control device 210 provides a so-called copy function.

The control device 210 also provides a so-called network scanner function of encoding image data read by the reader device 201, and transferring the encoded data to the client PC 103 or the like via the LAN 110.

Further, the control device 210 provides a so-called printer function of receiving code data transmitted from the client PC 103 via the LAN 110, converting it into image data, and causing the printer device 220 to print the image data on a print sheet.

The operation unit 230 is formed from, e.g., a touch panel type window. The operation unit 230 displays a variety of GUIs (Graphical User Interfaces). In addition, the operation unit 230 has a function of, when the user 104 designates a position on the window, notifying the control device 210 of the designated position. The operation unit 230 also has buttons as hardware. The user 104 can operate the buttons to input various instructions to the control device 210.

The FAX unit 240 also functions as a controller when performing FAX transmission/reception via the telephone line 120. The HDD 245 saves data externally received by the multi-function peripheral apparatus 101, and saves programs and data associated with GUIs to be described later.

Figure 3:
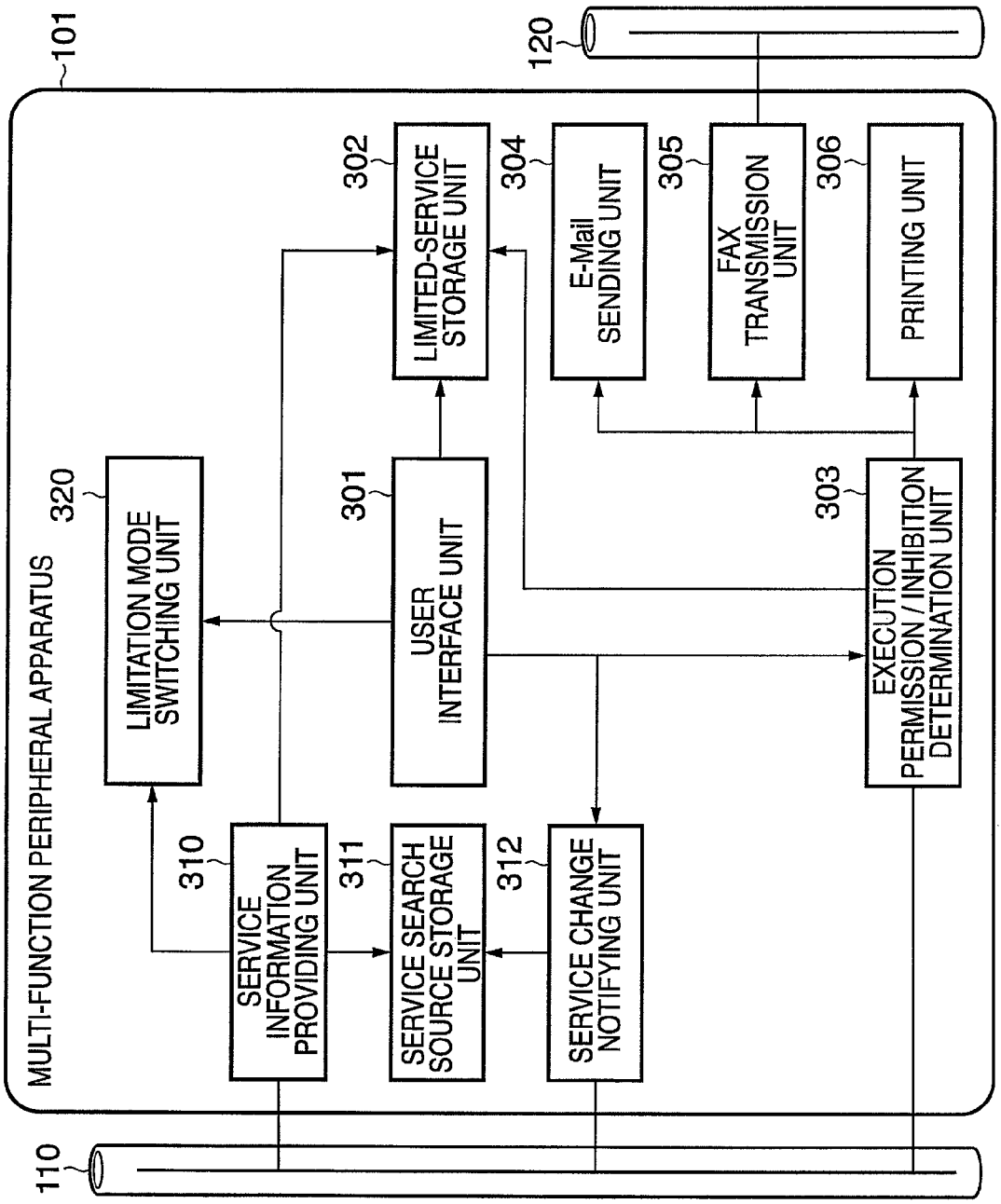
FIG. 3 is a block diagram showing the functional configuration of software stored in the internal memory of a control device 210.

FIG. 3 is a block diagram showing the functional configuration of software stored in the internal memory of the control device 210. The control device 210 executes software components shown in FIG. 3.

A user interface unit 301 accepts various instructions input via the operation unit 230. For example, the user interface unit 301 accepts instructions such as a print instruction, an e-mail send instruction, a FAX transmission instruction, and a setting instruction for a limitation mode (to be described later).

Figure 4A:
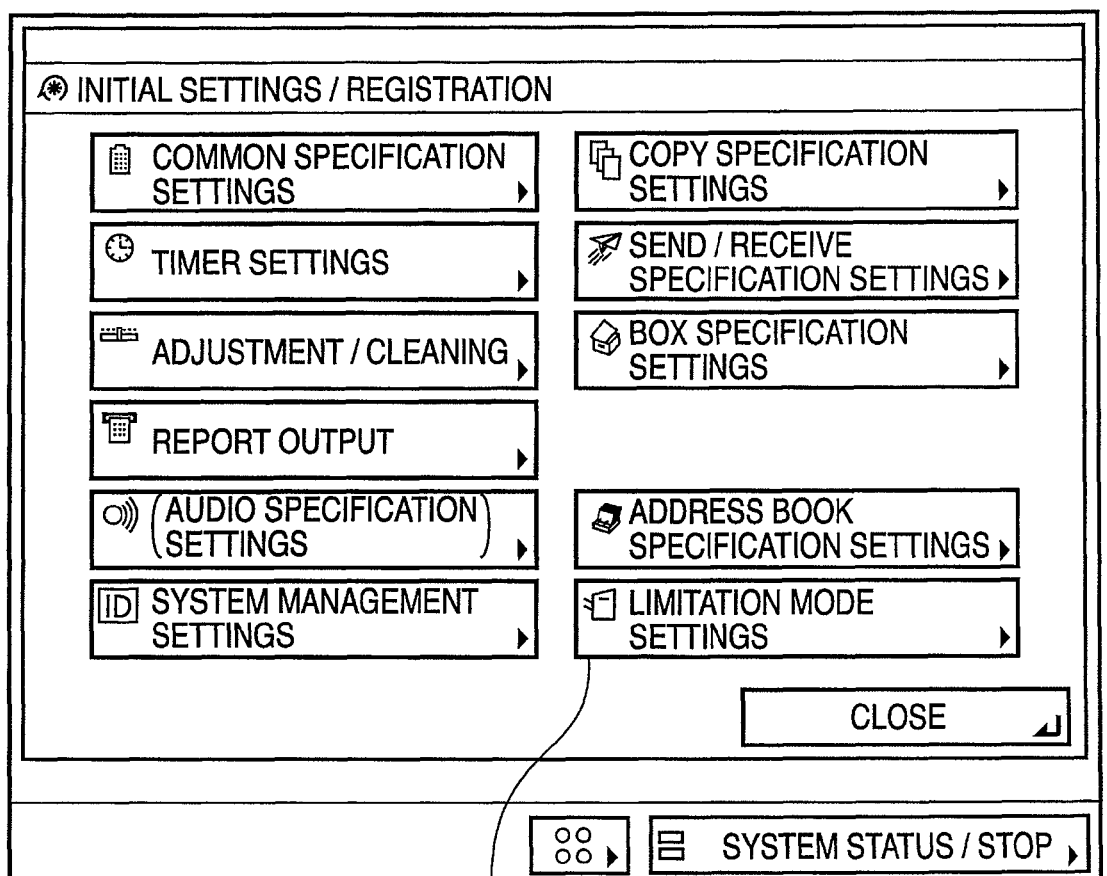
FIG. 4A is a view showing a display example of a GUI on the display screen of an operation unit 230.

FIG. 4A is a view showing a display example of a GUI on the display screen of the operation unit 230. The GUI shown in FIG. 4A is used to make device settings in the multi-function peripheral apparatus 101. When the user designates a target button image on the display screen of the operation unit 230 or a target one of buttons serving as hard keys, an image corresponding to the designation appears on the display window.

In FIG. 4A, a button image 402 is to be designated upon setting details of the limitation mode (to be described later). When the user 104 designates the button image 402, the control device 210 is notified of the designation and displays a GUI shown in FIG. 4B on the display screen of the operation unit 230.

Figure 4B:
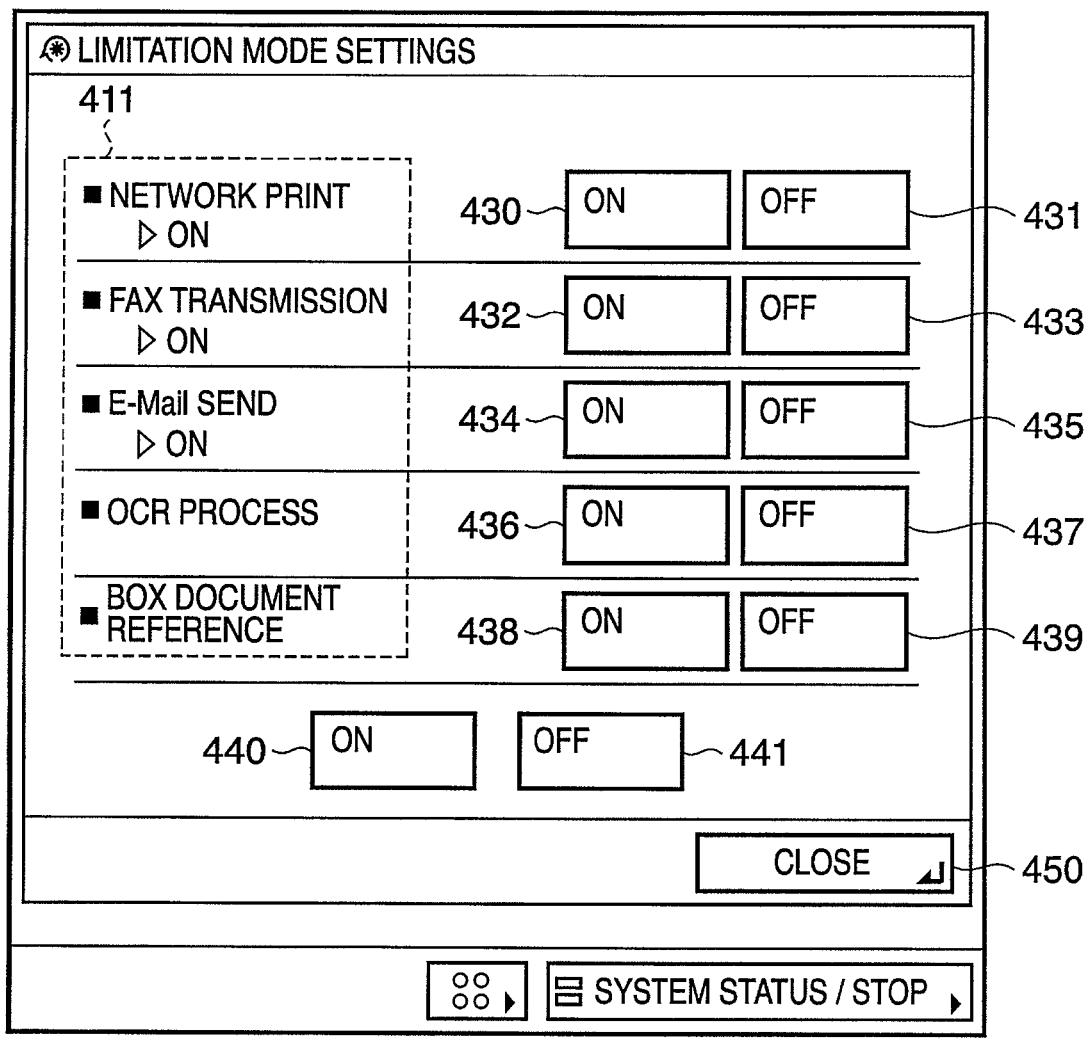
FIG. 4B is a view showing a display example of a GUI for setting details of the limitation mode.

FIG. 4B is a view showing a display example of a GUI for setting details of the limitation mode. In the GUI of FIG. 4B, an area 411 is used for displaying a list of the names of processes executable by the multi-function peripheral apparatus 101. Information displayed in the area 411 may be other than the process names as long as the information is about processes executable by the multi-function peripheral apparatus 101.

In FIG. 4B, in the area 411, the names of five processes: network print, FAX transmission, E-Mail send, OCR process, and box document reference, are displayed. These five processes are executable by the multi-function peripheral apparatus 101 when the multi-function peripheral apparatus 102 or client PC 103 requests them.

For example, network print is a function of performing a print process based on print data and a print form transmitted from the multi-function peripheral apparatus 102 or client PC 103. The OCR process is a function of extracting a character string contained in an image transmitted from the multi-function peripheral apparatus 102 or client PC 103, and generating text data of the extracted character string. Box document reference is a function of transmitting, to the multi-function peripheral apparatus 102 or client PC 103, image data held in a storage area called a box allocated in advance in the HDD 245.

Other process names can be also displayed in the area 411, such as encryption/PDF conversion, signature PDF conversion, image compression, and image format conversion. In addition to the above-mentioned concrete process names, the area 411 may also allow setting whether or not physical components such as the printer unit, telephone line, and HDD can be available.

Button images 430 and 431 are used to select and designate whether or not permitting the multi-function peripheral apparatus 101 to execute a network print process when the multi-function peripheral apparatus 102 or client PC 103 requests it. By designating the button image 430, the user can input a selection instruction to permit execution of the network print process. By designating the button image 431, the user can input a selection instruction to inhibit the execution.

Button images 432 and 433 are used to select and designate whether or not permitting the multi-function peripheral apparatus 101 to execute a FAX transmission process when the multi-function peripheral apparatus 102 or client PC 103 requests it. By designating the button image 432, the user can input a selection instruction to permit execution of the FAX transmission process. By designating the button image 433, the user can input a selection instruction to inhibit the execution.

Button images 434 and 435 are used to select and designate whether or not permitting the multi-function peripheral apparatus 101 to execute an E-Mail send process when the multi-function peripheral apparatus 102 or client PC 103 requests it. By designating the button image 434, the user can input a selection instruction to permit execution of the E-Mail send process. By designating the button image 435, the user can input a selection instruction to inhibit the execution.

Button images 436 and 437 are used to select and designate whether or not permitting the multi-function peripheral apparatus 101 to execute an OCR process when the multi-function peripheral apparatus 102 or client PC 103 requests it. By designating the button image 436, the user can input a selection instruction to permit execution of the OCR process. By designating the button image 437, the user can input a selection instruction to inhibit the execution.

Button images 438 and 439 are used to select and designate whether or not permitting the multi-function peripheral apparatus 101 to execute a box document reference process when the multi-function peripheral apparatus 102 or client PC 103 requests it. By designating the button image 438, the user can input a selection instruction to permit execution of the box document reference process. By designating the button image 439, the user can input a selection instruction to inhibit the execution.

Using the button images 430 to 439, the user can select whether to permit/inhibit execution of each process displayed in the area 411. The selection results (permit=ON/inhibit=OFF) of the respective processes are displayed below corresponding process names in the area 411.

A mode for reflecting the selection results in subsequent processes will be called a limitation mode.

Button images 440 and 441 are used to select and designate whether or not enabling the limitation mode. The limitation mode is enabled in subsequent processes by designating the button image 440, and disabled in subsequent processes by designating the button image 441. With one button, the user can easily switch to enable or disable each content selected for each process as described above.

Note that limited processes may be represented with instruction contents with which the operator can conceptually understand the reason of limitation.

For example, limited processes may also be represented as "noise limitation", "telephone line use limitation", "network traffic limitation", "program startup limitation", and "HDD load limitation".

When "noise limitation" is enabled, network print which generates large noise is limited. In this case, facsimile transmission may also be limited because a beep is sometimes output from the loudspeaker in facsimile communication.

When "telephone line use limitation" is enabled, facsimile transmission is limited.

When "network traffic limitation" is enabled, E-Mail send is limited. Another process which increases the traffic via the network may also be limited.

When "program startup limitation" is enabled, a process such as the OCR process which newly starts up a program and increases the load on the control device 210 is limited.

When "HDD load limitation" is enabled, a process such as box document reference which frequency accesses the HDD is limited.

A button image 450 is used to input an instruction to save, in the HDD 245, setting information representing contents set via the GUI shown in FIG. 4B and display the GUI shown in FIG. 4A on the display screen of the operation unit 230.

Referring back to FIG. 3, the user interface unit 301 accepts the above-described instructions via the GUIs. If the user interface unit 301 detects that the user has designated the button image 450, a limited-service storage unit 302 stores, in the HDD 245, setting information representing contents set via the GUI shown in FIG. 4B.

Upon accepting an execution request of process from the multi-function peripheral apparatus 102 or client PC 103 via the LAN 110, an execution permission/inhibition determination unit 303 refers to the setting information saved in the HDD 245 by the limited-service storage unit 302. Then, the execution permission/inhibition determination unit 303 determines whether it is set via the GUI shown in FIG. 4B to permit the execution-requested process. The execution permission/inhibition determination unit 303 notifies an E-Mail sending unit 304, FAX transmission unit 305, and printing unit 306 (to be described later) of the determination result.

The E-Mail sending unit 304 sends, to a designated destination, image data received from the multi-function peripheral apparatus 102 or client PC 103, or image data designated by the multi-function peripheral apparatus 102 or client PC 103 of image data saved in the HDD 245. The E-Mail sending unit 304 sends E-Mail when the execution permission/inhibition determination unit 303 accepts an E-Mail send request from the multi-function peripheral apparatus 102 or client PC 103, and determines to permit the request. In other words, even upon receiving an E-Mail send request from the multi-function peripheral apparatus 102 or client PC 103, the E-Mail sending unit 304 does not perform the requested E-Mail send unless the execution permission/inhibition determination unit 303 permits the request. The determination by the execution permission/inhibition determination unit 303 complies with contents set by the user 104 via the GUI shown in FIG. 4B using either the button image 434 or 435.

The FAX transmission unit 305 transmits, to a designated destination, image data received from the multi-function peripheral apparatus 102 or client PC 103, or image data designated by the multi-function peripheral apparatus 102 or client PC 103 of image data saved in the HDD 245. As described above, this transmission is FAX transmission via the telephone line 120 which is executed by the FAX unit 240. The FAX transmission unit 305 performs FAX transmission when the execution permission/inhibition determination unit 303 accepts a FAX transmission request from the multi-function peripheral apparatus 102 or client PC 103, and determines to permit this request. In other words, even upon receiving a FAX transmission request from the multi-function peripheral apparatus 102 or client PC 103, the FAX transmission unit 305 does not perform the requested FAX transmission unless the execution permission/inhibition determination unit 303 permits the request. The determination by the execution permission/inhibition determination unit 303 complies with contents set by the user 104 via the GUI shown in FIG. 4B using either the button image 432 or 433.

The printing unit 306 causes the printer device 220 to perform a print process based on image data received from the multi-function peripheral apparatus 102 or client PC 103, or image data designated by the multi-function peripheral apparatus 102 or client PC 103 of image data saved in the HDD 245. The printing unit 306 prints when the execution permission/inhibition determination unit 303 accepts a print request from the multi-function peripheral apparatus 102 or client PC 103, and determines to permit this request. In other words, even upon receiving a print request from the multi-function peripheral apparatus 102 or client PC 103, the printing unit 306 does not perform the requested printing unless the execution permission/inhibition determination unit 303 permits the request. The determination by the execution permission/inhibition determination unit 303 complies with contents set by the user 104 via the GUI shown in FIG. 4B using either the button image 430 or 431.

A service information providing unit 310 accepts an inquiry about "processes executable by the multi-function peripheral apparatus 101 for the multi-function peripheral apparatus 102 or client PC 103 " from the multi-function peripheral apparatus 102 or client PC 103. When the service information providing unit 310 detects this inquiry, it refers to the setting information saved in the HDD 245 by the limited-service storage unit 302, and sends back information on permitted processes to an apparatus which has transmitted the inquiry.

A service search source storage unit 311 registers, in the HDD 245, information (device information) on the apparatus which has transmitted the inquiry to the service information providing unit 310.

When the user interface unit 301 detects change of settings via the GUI shown in FIG. 4B, a service change notifying unit 312 refers to device information saved in the HDD 245 by the service search source storage unit 311. The service change notifying unit 312 notifies all devices, whose information is registered in the device information, of the change of settings and the changed setting contents.

A limitation mode switching unit 320 enables/disables the limitation mode in accordance with designation of either the button image 440 or 441 shown in FIG. 4B. The HDD 245 stores information representing whether the limitation mode is enabled or disabled at present.

Figure 5:
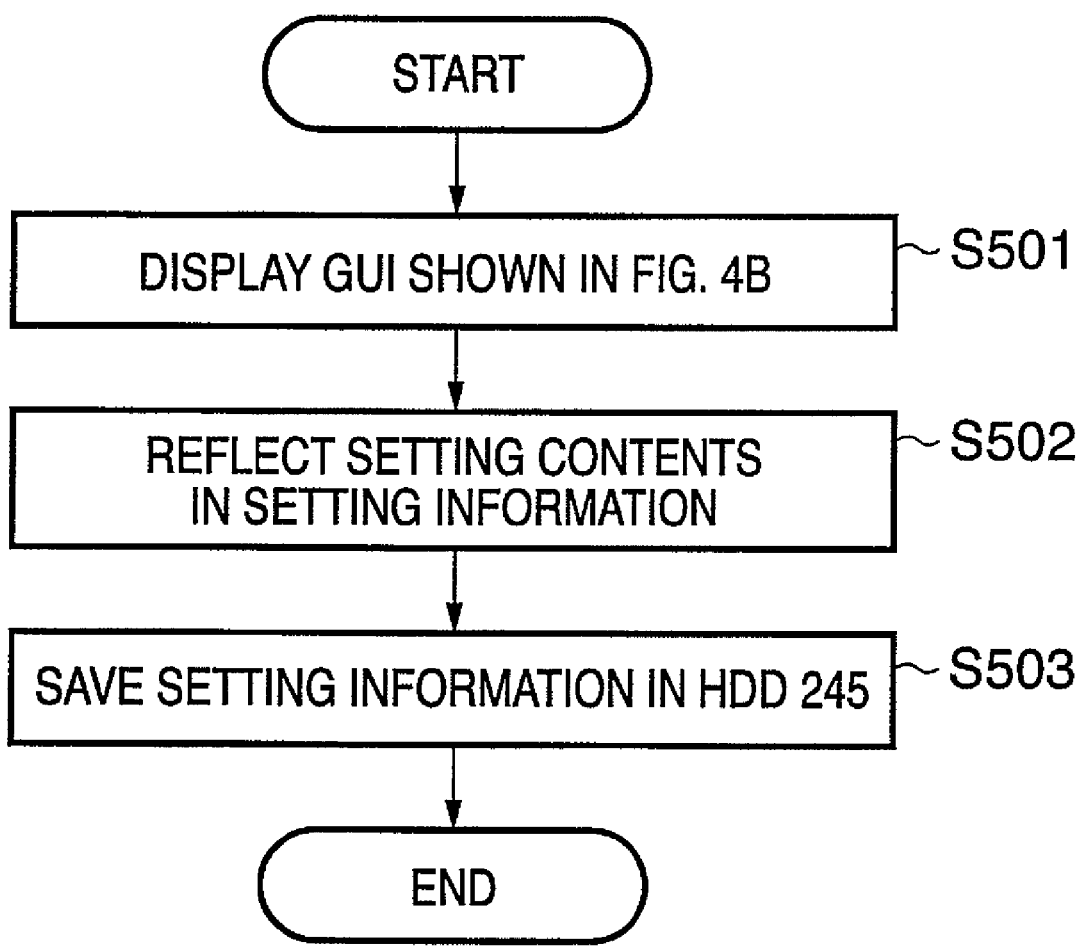
FIG. 5 is a flowchart showing a process executed by the control device 210 when a user 104 sets the limitation mode using the multi-function peripheral apparatus 101.

FIG. 5 is a flowchart showing a process executed by the control device 210 when the user 104 sets the limitation mode using the multi-function peripheral apparatus 101. The internal memory of the control device 210 stores a program and data which are used for causing the control device 210 to execute this process. The CPU of the control device 210 executes the process using the program and data, thus the multi-function peripheral apparatus 101 executes each process to be described below.

When the user 104 designates the button image 402 while the GUI shown in FIG. 4A is displayed on the display screen of the operation unit 230, as described above, the control device 210 detects this designation. In step S501, the GUI shown in FIG. 4B is displayed on the display screen of the operation unit 230.

Using this GUI, the user 104 designates each button image to designate whether or not permitting corresponding process. In step S502, the control device 210 reflects, in setting information, whether each process is permitted or inhibited. The control device 210 also reflects, in the setting information, a result (whether to enable or disable the limitation mode) designated with the button image 440 or 441.

If the control device 210 detects designation of the button image 450, it saves the setting information in the HDD 245 in step S503.

Figure 6:
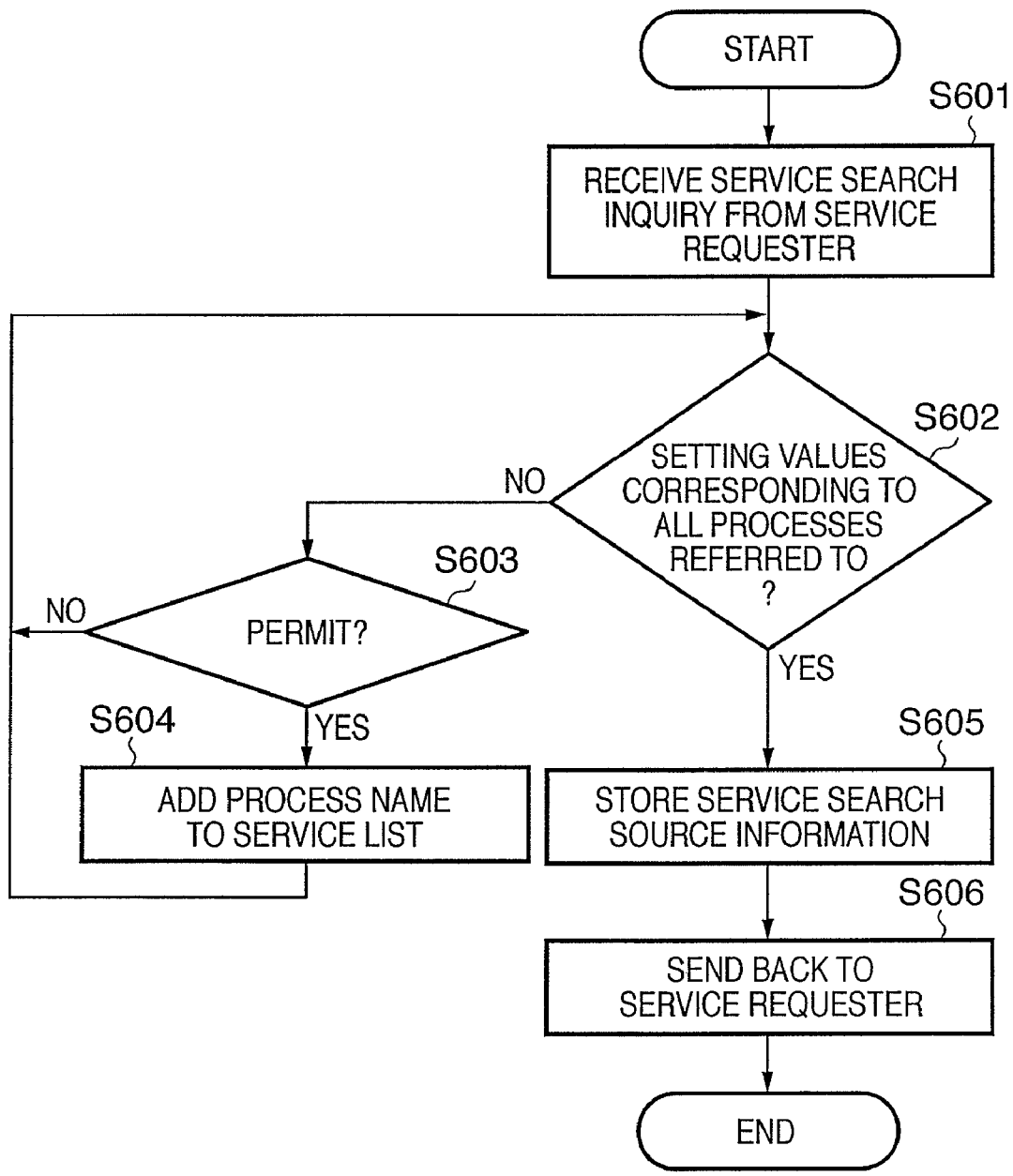
FIG. 6 is a flowchart showing a process executed by the control device 210 upon detecting an inquiry about "processes executable by the multi-function peripheral apparatus 101 for a multi-function peripheral apparatus 102 or client PC 103" from the multi-function peripheral apparatus 102 or client PC 103.

A process executed by the control device 210 upon detecting an inquiry about "processes executable by the multi-function peripheral apparatus 101 for the multi-function peripheral apparatus 102 or client PC 103" from the multi-function peripheral apparatus 102 or client PC 103 (service requester) will be explained. FIG. 6 is a flowchart showing this process. The internal memory of the control device 210 stores a program and data which are used for causing the control device 210 to execute this process. The CPU of the control device 210 executes the process using the program and data, thus the multi-function peripheral apparatus 101 executes each process to be described below.

When the service requester transmits the inquiry to the multi-function peripheral apparatus 101 via the LAN 110, the control device 210 detects this inquiry in step S601. At this time, the control device 210 acquires information (device information) about the service requester which has transmitted the inquiry. This technique is well known in the communication technology. For example, the control device 210 acquires the network address of the service requester.

In step S602, the control device 210 refers to the setting information saved in the HDD 245. As described above, the setting information holds a setting value representing whether or not permitting execution of each process, which can be executed by the multi-function peripheral apparatus 101, when the service requester requests the execution. In this step, the control device 210 acquires the setting value of one process first. Then, the process proceeds to step S603.

In step S603, the control device 210 checks whether the acquired setting value represents "permit". If the acquired setting value represents "permit" as a result of the check (YES in step S603), the process proceeds to step S604; if "NO", returns to step S602.

In step S604, the control device 210 registers, in the service list, a process name corresponding to the setting value acquired in step S602. Then, the process returns to step S602. In step S602, the control device 210 acquires the setting value of the next process, and repeats the subsequent process. If the control device 210 has acquired the setting values of all processes included in the setting information, the process proceeds to step S605.

In step S605, the control device 210 saves, in the HDD 245, the device information acquired in step S601. In step S606, the control device 210 sends back the service list to a destination (service requester) specified by the device information. At the same time, the control device 210 also transmits information representing whether the limitation mode is enabled or disabled.

Accordingly, the service requester can acquire information on processes which can be requested for the multi-function peripheral apparatus 101.

FIG. 7 is a flowchart showing a process executed by the control device 210 to announce change of settings when detailed settings of the limitation mode have changed in the multi-function peripheral apparatus 101.

Assume that the user 104 opens the GUI shown in FIG. 4B again, and changes settings. For example, the user 104 set to permit network print before, but sets to inhibit it this time. When the user 104 has made this setting change, the control device 210 executes the process according to the flowchart shown in FIG. 5 in step S701 to update setting information.

In step S702, the control device 210 acquires device information saved in the HDD 245, and specifies the setting change notification destination.

In step S703, the control device 210 acquires the currently changed setting contents. That is, the control device 210 acquires the contents updated in step S701. In step S704, the control device 210 transmits the updated contents acquired in step S703 to a destination specified by the device information acquired in step S702.

Noted that the control device 210 may acquire the currently changed information in step S703, and in step S704 transmit the setting information to a destination specified by the device information acquired in step S702.

In the above description, the contents of limitation are reflected for a requester which has transmitted a service search inquiry. In general, the user of the multi-function peripheral apparatus 101 can execute even a process for which the limitation mode is enabled. A user for whom even the setting "enable" of the limitation mode is not reflected is registered in advance in the HDD 245 or the like.

A service requester may inquire the presence/absence of concrete service contents instead of inquiring all services executable by the multi-function peripheral apparatus 101. In this case, as its response, services except for ones for which the limitation mode is enabled of inquired services are sent back to the requester.

As described above, according to the first embodiment, even if an apparatus capable of executing various processes including process which generates noise is requested to execute the process which generates noise, it can be set to inhibit execution of the process. Even when the apparatus is installed in a place where it needs to be noiseless, generation of noise can be prevented in advance. It can also be limited to use the apparatus from a remote place for a process which does not generate noise but is temporarily inhibited.

This setting can be made for each process. For example, even when the apparatus is used not from a remote place but directly, a desired process can be executed without any limitation.

In the above description, the operator puts limitation by the limitation mode by enabling or disabling the limitation mode. It is also possible to enable a process in a predetermined time period in association with, e.g., the scheduling function.

[Second Embodiment]

In the first embodiment, services are directly searched between devices. However, the present invention may also adopt another configuration. For example, it is also possible to install a server on the LAN 110, and prepare a UDDI service registry in the server, similar to a general Web service configuration. In this case, the multi-function peripheral apparatus 101 serving as a service provider needs to register its services. The multi-function peripheral apparatus 102 needs to search for services by WSDL and then utilize the services of the multi-function peripheral apparatus 101. As a matter of course, the present invention is not limited to specific techniques such as UDDI and WSDL, and may also be implemented by an original protocol.

In the window shown in FIG. 4B, the user sets permission/inhibition of execution of each process which can be requested by the multi-function peripheral apparatus 102 or client PC 103. However, when the user 104 inputs an execution request via the operation unit 230, this window may also allow him to set whether to permit or inhibit a process corresponding to the execution request. In addition, this window may also allow setting a time period during which a process is permitted, and a user type permitted to execute a process.

In the first embodiment, since a service requester directly searches a service provider for services, the change is notified the service requester. In the embodiment using the UDDI service registry, however, the service change notification process is to notify a server having the UDDI service registry of change of registered contents.

[Other Embodiments]

The object of the present invention is also achieved as follows. More specifically, a recording medium (or storage medium) which records software program codes for implementing the functions of the above-described embodiments is supplied to a system or apparatus. The computer (or the CPU or MPU) of the system or apparatus reads out and executes the program codes stored in the recording medium. In this case, the program codes read out from the recording medium implement the functions of the above-described embodiments, and the recording medium which records the program codes constitutes the present invention.

The present invention also includes a case where the following process implements the functions of the above-described embodiments. More specifically, the computer executes the readout program codes, and an OS (Operating System) or the like running on the computer performs some or all of actual processes on the basis of the instructions of the program codes.

Further, the present invention also includes a case where the following process implements the functions of the above-described embodiments. More specifically, the program codes read out from the recording medium are written in the memory of a function expansion card inserted into the computer or the memory of a function expansion unit connected to the computer. Then, the CPU of the function expansion card or function expansion unit performs some or all of actual processes on the basis of the instructions of the program codes.

When the present invention is applied to the recording medium, the recording medium records program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-327636 filed Dec. 4, 2006, which is hereby incorporated by reference herein in its entirety.

What is claimed is:

1. An information processing apparatus which executes a process requested by an external apparatus, comprising:
   a processing unit configured to execute a process instructed by an instruction from an operation unit of the information processing apparatus or an instruction from the external apparatus, wherein the executed process is one process among plural processes, each of which is executable by the processing unit and has a different type from those of others of the plural processes;

a setting unit configured to set, for each of the plural processes, whether or not to inhibit executing in response to the instruction from the external apparatus;

a reception unit configured to receive a search request, from the external apparatus; and a transmission unit configured to send back, to the external apparatus, identification information of each of the plural processes other than any process that is set by the setting unit to be inhibited, in response to receiving the search request from the external apparatus, wherein the processing unit executes the process instructed by the instruction from the operation unit, regardless of whether the process instructed by the instruction from the operation unit is set by the setting unit to be inhibited or not to be inhibited.

2. The apparatus according to claim 1, further comprising a display control unit configured to display a list of information representing at least one of the processes executable by the information processing apparatus, and a selection unit configured to select, for each process represented by the list of information, whether or not the information processing apparatus is permitted to perform the process, wherein the setting unit sets an operation result of the selection unit.

3. The apparatus according to claim 1, wherein when the setting unit makes a setting again, the transmission unit notifies the external apparatus of information on the setting.

4. An information processing method performed by an information processing apparatus which executes a process requested by an external apparatus, the method comprising:

a processing step for executing a process instructed by an instruction in an operation step of the information processing apparatus or by an instruction from the external apparatus, wherein the executed process is one process among plural processes, each of which is executable in the processing step and has a different type from those of others of the plural processes;

causing a setting unit to set, for each of the plural processes, whether or not to inhibit executing in response to the instruction from the external apparatus;

a reception step of receiving a search request, from the external apparatus; and causing a transmission unit to send back, to the external apparatus, identification information of each of the plural processes other than any process that is set in the setting step to be inhibited, in response to receiving the search request from the external apparatus, wherein in the processing step the process instructed by the instruction from the operation step is executed, regardless of whether the process instructed by the instruction from the operation step is set by the setting unit to be inhibited or not to be inhibited.

5. A non-transitory computer-readable storage medium which stores a program for causing a computer to execute an information processing method defined in claim 4.

6. The apparatus according to claim 1, wherein the processing unit is a printing unit which prints an image on the basis of print data received from the external apparatus.

7. The apparatus according to claim 1, wherein the processing unit is a facsimile unit which transmits facsimile data to the external apparatus.

8. The apparatus according to claim 1, wherein the processing unit is a unit which transmits e-mail data.

9. An image processing apparatus capable of communicating with an external apparatus, comprising:

an operation unit;

a facsimile unit configured to perform facsimile transmission in response to a request from the operation unit;

a setting unit configured to set to inhibit the facsimile transmission when the facsimile transmission is requested not from the operation unit but from the external apparatus;

a reception unit configured to receive, from the external apparatus, a search request for searching for services which can be provided by the image processing apparatus;

a determination unit configured to determine whether or not the setting unit sets to inhibit the facsimile transmission; and a transmission unit configured to transmit, to the external apparatus, a service list in which remaining services other than the facsimile transmission among the services are registered, when the reception unit receives the search request and the determination unit determines that the setting unit sets to inhibit the facsimile transmission, wherein the facsimile unit performs the facsimile transmission in response to the request from the operation unit, even if the setting unit sets to inhibit the facsimile transmission.

10. An image processing method performed by an image processing apparatus capable of communicating with an external apparatus, wherein the image processing apparatus comprises an operation unit and a facsimile unit configured to perform facsimile transmission in response to a request from the operation unit, the method comprising:

causing a setting unit to set to inhibit the facsimile transmission when the facsimile transmission is requested not from the operation unit but from the external apparatus;

a reception step of receiving, from the external apparatus, a search request for searching for services which can be provided by the image processing apparatus;

a determination step of determining whether or not the setting unit sets to inhibit the facsimile transmission; and causing a transmission unit to transmit, to the external apparatus, a service list in which remaining services other than the facsimile transmission among the services are registered, when the search request is received in the reception step and it is determined in the determination step that the setting unit sets to inhibit the facsimile transmission, wherein the facsimile unit performs the facsimile transmission in response to the request from the operation unit, even if the setting unit sets to inhibit the facsimile transmission.

* * * * *